United States Patent
Ichikawa et al.

(10) Patent No.: US 9,617,683 B2
(45) Date of Patent: Apr. 11, 2017

(54) SEPARATION MEMBRANE AND METHOD FOR PRODUCING SAME

(75) Inventors: Tatsuya Ichikawa, Ehime (JP); Sadajiro Hatano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 5 days.

(21) Appl. No.: 13/636,316

(22) PCT Filed: Mar. 17, 2011

(86) PCT No.: PCT/JP2011/056341
§ 371 (c)(1),
(2), (4) Date: Oct. 5, 2012

(87) PCT Pub. No.: WO2011/118486
PCT Pub. Date: Sep. 29, 2011

(65) Prior Publication Data
US 2013/0020251 A1    Jan. 24, 2013

(30) Foreign Application Priority Data
Mar. 23, 2010 (JP) .................................. 2010-065661

(51) Int. Cl.
*B01D 69/10* (2006.01)
*B01D 69/06* (2006.01)
(Continued)

(52) U.S. Cl.
CPC ............ *D06M 15/256* (2013.01); *B01D 69/02* (2013.01); *B01D 69/06* (2013.01); *B01D 69/12* (2013.01);
(Continued)

(58) Field of Classification Search
CPC ........ B01D 69/02; B01D 69/04; B01D 69/06; B01D 69/10; B01D 69/12; B01D 69/14;
(Continued)

(56) References Cited

U.S. PATENT DOCUMENTS 5,482,625 A * 1/1996 Shimizu ................. B01D 61/18
   210/231
6,153,098 A * 11/2000 Bayerlein ............ B01D 29/216
   210/321.74
(Continued)

FOREIGN PATENT DOCUMENTS

EP    0 599 791 A2    6/1994
JP    H07024271    *    1/1995
(Continued)

OTHER PUBLICATIONS

Enlish language machine translation of JP-H07-024271, pp. 1-4, No Date.*
(Continued)

*Primary Examiner* — David C Mellon
*Assistant Examiner* — Pranav Patel
(74) *Attorney, Agent, or Firm* — Birch, Stewart, Kolasch & Birch, LLP

(57) ABSTRACT

Disclosed is a separation membrane comprising—an elongated substrate having fluid permeability and a separation layer formed at the surface of said substrate—wherein the aforementioned separation layer comprises a predetermined thickness section having a predetermined thickness and thin sections each positioned on the outside of both edges in the widthwise direction of said predetermined thickness portion and having a thinner thickness than the aforementioned predetermined thickness, and there is a separation-layer-lacking section, at which only the aforementioned substrate is present and the aforementioned separation layer is absent, between the outside edges in the widthwise direction of each of said thin sections and the outer edges in the widthwise direction of the aforementioned substrate. The separation membrane can be produced by using coating bar having a protrusion on both the left and right ends of the surface that
(Continued)

contacts a macromolecule solution for forming the separation layer.

10 Claims, 6 Drawing Sheets

(51) Int. Cl.
| | | |
|---|---|---|
| D06M 15/256 | (2006.01) | |
| B01D 69/02 | (2006.01) | |
| B01D 69/12 | (2006.01) | |
| D06M 15/07 | (2006.01) | |
| D06M 15/59 | (2006.01) | |
| D06M 15/63 | (2006.01) | |

(52) U.S. Cl.
CPC ............ *D06M 15/07* (2013.01); *D06M 15/59* (2013.01); *D06M 15/63* (2013.01); *B01D 2323/42* (2013.01); *B01D 2325/04* (2013.01); *B01D 2325/24* (2013.01)

(58) Field of Classification Search
CPC ............ B01D 67/0009; B01D 2325/04; B01D 2325/06; B01D 2325/08; B01D 2321/2016; B01D 2323/42; C02F 3/1273; C02F 1/44; B32B 3/02–3/30; B32B 7/14; B32B 7/045; B32B 2250/02; B32B 5/145
USPC .............................................. 428/37, 43, 53
See application file for complete search history.

(56) References Cited

U.S. PATENT DOCUMENTS

| | | | |
|---|---|---|---|
| 2005/0260381 A1* | 11/2005 | Ditter ................... | B01D 69/10 428/131 |
| 2006/0016685 A1* | 1/2006 | Hawkins et al. ............. | 204/296 |
| 2006/0073610 A1* | 4/2006 | Kopaciewicz ................ | 436/518 |
| 2007/0023290 A1 | 2/2007 | Hawkins et al. | |
| 2008/0138596 A1 | 6/2008 | Yoshida et al. | |

FOREIGN PATENT DOCUMENTS

| | | |
|---|---|---|
| JP | 9-313905 A | 12/1997 |
| JP | 2000-42384 A | 2/2000 |
| JP | 2003-245530 A | 9/2003 |
| JP | 2007-283287 A | 11/2007 |
| JP | 2007-289935 A | 11/2007 |
| JP | 2007-289937 A | 11/2007 |
| JP | 2008-119680 A | 5/2008 |
| WO | WO 2006/068100 A1 | 6/2006 |

OTHER PUBLICATIONS

English language machine translation of JP2003245530, No Date, 15 pages.*
International Search Report issued in PCT/JP2011/056341 mailed Apr. 19, 2011.
Extended European Search Report issued Dec. 4, 2013, in European Patent Application No. 11759292.3.

* cited by examiner

SEPARATION MEMBRANE AND METHOD FOR PRODUCING SAME

TECHNICAL FIELD

The present invention relates to separation membranes, such as reverse osmosis membranes, microfilter membranes and ultrafiltration membranes, and production methods thereof.

BACKGROUND ART

Separation membranes are used in many different fields, such as the water treatment field including seawater desalination, water purification and drainage treatment; the medical field including blood purification; the food industry field; and the electrical industry field including battery separators, charged membranes and fuel cells. Such separation membranes generally comprise a woven or nonwoven fabric base (sheet) and a separation layer having a separation function, which is formed directly over the base. For example, JP 2007-283287 A discloses a separation membrane comprising a polyvinylidene fluoride-based separation layer formed over a nonwoven polyester base, and JP 2003-245530 A and JP 09-313905 A disclose separation membranes comprising a polysulfone separation layer formed over a nonwoven polyester base.

Such separation membranes are produced by applying a polymer solution for separation layer formation to a surface of an elongated base and then passing the base through a solidifying step and a cleaning step to form a separation layer directly over the surface of the base. In doing so, the base and the separation layer have different chemical compositions and different thermal shrinkage ratios from each other, and this causes a phenomenon to occur in which both widthwise ends of the base curl.

This curling phenomenon is explained in FIG. 12a, FIG. 12b and FIG. 12c. FIG. 12a is a cross-sectional view of an elongated base 121 immediately after a polymer solution coating film 122 has been formed over the surface of the base 121 subsequent to a polymer solution for separation layer formation being applied to the base 121. In FIG. 12a, the crosswise direction of the base 121 is the width direction thereof, and the longitudinal direction of the base 121 is perpendicular to the page. The base 121 coated with the polymer solution is subsequently soaked in a solidifying solution to form a solidified polymer solution coating film 122. Next, the base 121 having the polymer solution coating film 122, which has been solidified thereon, is washed with water and cleaned, and a separation membrane comprising a base and a separation layer is finally produced.

In the solidifying step and the water-washing step, shrinkage occurs in both the base 121 and the polymer solution coating film 122. In respect of the occurrence of shrinkage, the shrinkage of the polymer solution coating film 122 is greater than that of the base 121, and accordingly, the shrinkage difference between the base 121 and the polymer solution coating film 122 becomes obvious at both widthwise end portions of the base 121, causing the base 121 to curl.

FIG. 12b is a cross-sectional view of the base 121 in the initial state with curls 123 beginning to develop at both end portions of the base 121. FIG. 12c is a cross-sectional view of curls 123 that are further rolled 124 as both ends of the base 121 are brought inwards.

The occurrence of the curls 124 shown in FIG. 12c in both end portions of the base 121 significantly reduces the operability of the production and element formation processes of separation membranes.

PRIOR ART DOCUMENTS

Patent Documents

Patent Document 1: JP 2007-283287 A
Patent Document 2: JP 2003-245530 A
Patent Document 3: JP 09-313905 A

SUMMARY OF THE INVENTION

Technical Problem

The object of the invention is to provide a separation membrane substantially free from curling and a method for production thereof wherein the occurrence of curling of both widthwise end portions of an elongated base during the production process of a separation membrane as seen in the abovementioned prior art is suppressed.

Solution to Problem

A separation membrane for achieving the object is as follows.

A separation membrane comprising an elongated fluid-permeable base and a separation layer formed over the surface of the base, wherein the separation layer includes a predetermined thickness portion having a predetermined thickness and a thinner portion positioned on the outside of each widthwise end of the predetermined thickness portion and having a thickness smaller than the predetermined thickness, and also wherein a separation-layer-lacking portion, at which only the base is present while the separation layer is absent, exists between each widthwise outer end of the thinner portion and each widthwise end of the base.

In the separation membrane, it is preferred that the base is formed of a nonwoven fabric, and that the separation layer is formed of at least one selected from the group consisting of polysulfone, polyvinylidene fluoride and cellulose acetate. The separation membrane of this embodiment comprises a separation layer which is composed of a single layer. Preferred examples of the separation membrane comprising a separation layer composed of a single layer include ultrafiltration membrane, microfilter membrane, reverse osmosis membrane and nanofiltration membrane.

In the separation membrane, a second separation layer formed in a uniform thickness may be present on the surface of the aforementioned separation layer.

In the separation membrane, it is preferred that the base is formed of a nonwoven fabric, that the separation layer is formed of polysulfone, and that the second separation layer is formed of polyamide. The separation membrane of this embodiment is a composite separation membrane which comprises a separation layer composed of multiple layers. Preferred examples of the composite separation membrane comprising a separation layer composed of multiple layers include reverse osmosis membrane and nanofiltration membrane.

In the separation membrane comprising a separation layer composed of a single layer, there may be a fluid-permeable protective layer formed in a uniform thickness over the surface of the separation layer.

In the composite separation membrane, there may be a fluid-permeable protective layer formed in a substantially uniform thickness over the surface of the aforementioned second separation layer.

In the separation membrane, the thickness of the thinner portion may be substantially uniform in the width direction thereof. Alternatively, the thickness may become smaller as the thinner portion is sloped towards the outer end, or may change as the thinner portion forms a step-like shape. Incidentally, when the thickness of the thinner portion is "substantially" uniform in the width direction thereof, the thickness may vary within the range of ±20% in the width direction.

In the separation membrane, the thickness of the thinner portion is preferably 5 to 95% of the thickness of the aforementioned predetermined thickness portion.

In the separation membrane, the width of the thinner portion is preferably 0.1 to 10% of the width of the aforementioned base.

In the separation membrane, the width of the separation-layer-lacking portion is preferably 0.1-10% of the width of the aforementioned base.

After being produced, these separation membranes may be taken up in a roll shape in such a way that the base is positioned on the outer side of the roll. Many separation membranes are stored in such rolled-up form. In many cases, a separation membrane used for producing separation elements is prepared by cutting a necessary length of the separation membrane which is drawn out of the roll thereof.

A method for producing a separation membrane for achieving the object is as follows.

A method for producing a separation membrane comprising a polymer solution application step for applying a polymer solution for separation membrane formation over a surface of a continuously transferred, elongated fluid-permeable base by a coating bar provided in a bar coater, and a separation layer formation step for forming a separation layer over the surface of the base by soaking the base, which has been through the polymer solution application step, in a solidifying solution for solidifying the polymer solution applied over the surface of the base, wherein, in the polymer solution application step, a polymer solution free portion, to which the polymer solution is not applied, is left on each widthwise end of the surface of the base, while a coating bar having a protruded portion at the left and the right end portion of the surface in contact with the polymer solution is used as the coating bar provided in the bar coater for applying the polymer solution to the surface of the base in such a way that the separation layer, which is formed in the separation layer formation step, includes a predetermined thickness portion having a predetermined thickness and a thinner portion positioned between each outer end of the predetermined thickness portion and the inner end of each polymer solution free portion and having a thickness smaller than that of the predetermined thickness portion.

It is preferable that the method for producing a separation membrane further includes a second separation layer formation step for forming a second separation layer in a uniform thickness over the surface of the aforementioned separation layer which is formed in the separation layer formation step.

It is preferable that the method for producing a separation membrane further includes a protective layer formation step for forming a fluid-permeable protective layer in a uniform thickness over the surface of the separation layer which is formed in the separation layer formation step.

It is preferable that the method for producing a separation membrane further includes a protective layer formation step for forming a fluid-permeable protective layer in a uniform thickness over the surface of the second separation layer which is formed in the second separation layer formation step.

In the method for producing a separation membrane, it is preferable that in the bar coater, the height of the protruded portion as measured from the predetermined thickness portion-forming surface of the coating bar to the thinner portion-forming surface of the protruded portion is 5 to 95% of the distance between the surface of the base and the predetermined thickness portion-forming surface the of the coating bar.

Effect of the Invention

The separation membrane is produced through a step for applying a polymer solution for separation layer formation over the surface of a base, in which the polymer solution is applied over the surface of the base in such a way that a predetermined thickness portion, which is formed by applying the polymer solution to a predetermined thickness, and a thinner portion, which is positioned on either side of the predetermined thickness portion and formed by applying the polymer solution to a thickness smaller than that of the predetermined thickness portion, these portions being aligned in the width direction of the base, while an polymer solution free area in which the base is exposed is formed outside the polymer solution-applied area, and a separation layer formation step in which the polymer solution-applied base subsequently undergoes polymer solution solidifying treatment.

As a result, curling of a separation membrane, which occurs in the conventional separation layer formation steps or subsequent water-washing steps, can be prevented. This will bring stability to the operation of separation membrane production process and, provide a curl-free separation membrane. Using this curl-free separation membrane will also facilitate the production of a separation element to be incorporated in a separator.

DESCRIPTION OF EMBODIMENTS

Figure 1:
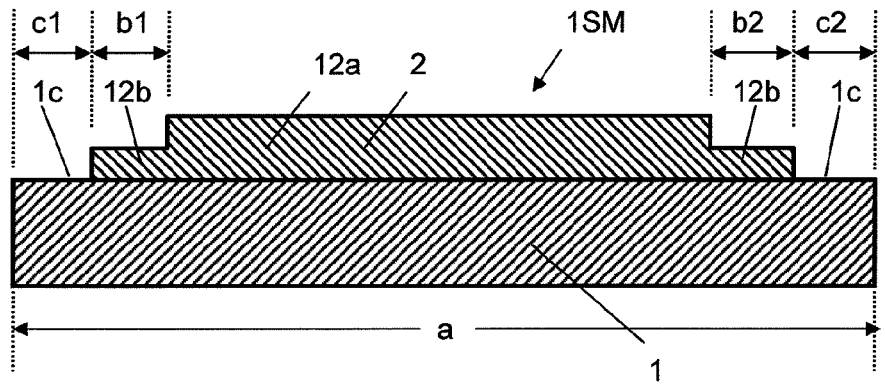
FIG. 1 is a cross-sectional view of an embodiment of a separation membrane.

FIG. 1 is a cross-sectional view of an embodiment of a separation membrane which is produced without curling occurring in either end thereof in a production process. In FIG. 1, a separation membrane 1SM comprises an elongated, fluid-permeable base 1 and a separation layer 2 which is formed over a surface of the base 1.

The separation layer 2 comprises a predetermined thickness portion 12a having a predetermined thickness required for fulfilling a separation function, and a thinner portion 12b positioned on the outside of either widthwise end of the predetermined thickness portion 12a and having a thickness smaller than the predetermined thickness, and the separation membrane 1SM has a separation-layer-lacking portion 1c, at which only the base 1 is present and the separation layer 2 is absent, between either widthwise outer end of the thinner portion 12b and either widthwise end of the base 1. The separation-layer-lacking portion 1c may also be referred to as base-exposed portion 1c.

The base 1 has a width a in the width direction thereof. A thinner portion 12b which is present at one end portion of the separation layer 2 has a width b1 in the width direction of the base 1. The thinner portion 12b which is present at the other end portion of the separation layer 2 has a width b2 in the width direction of the base 1. A separation-layer-lacking portion 1c which is present at one end portion of the base 1 has a width c1 in the width direction of the base 1. The separation-layer-lacking portion 1c which is present at the other end portion of the base 1 has a width c2 in the width direction of the base 1.

The cross-sectional contour formed by the surface of the separation layer 2 which begins at either widthwise end of the surface of the predetermined thickness portion 12a and extends via the surface of the thinner portion 12b to the surface of the base 1, may form a step-like shape, a continuous straight line, or a continuous curve.

FIG. 1 shows a separation membrane 1SM in which the contour forms a step-like shape and the thickness value of the thinner portion 12b corresponds to the total width value of the width b1 and the width b2, i.e. the surface of the thinner portion 12b is flat. The contour of the step-like shape may have multiple steps.

The separation layer 2 of the separation membrane 1SM in FIG. 1 is formed of a single layer comprising material having a separation function, which is formed over the surface of the base 1. This single layer is often referred to as an asymmetric membrane.

Figure 2:
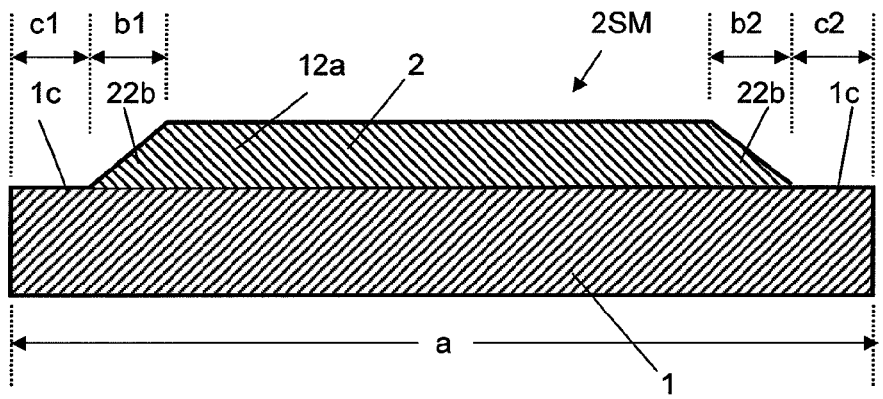
FIG. 2 is a cross-sectional view of another embodiment of the separation membrane.

FIG. 2 is a cross-sectional view of another embodiment of the separation membrane. The difference between the separation membrane 2SM in FIG. 2 and the separation membrane 1SM in FIG. 1 is the cross-sectional shape of the separation layer 2. The cross-sectional contour formed by the surface of the separation layer 2, which begins either end of the predetermined thickness portion 12b and extends via the thinner portion 22b to the surface of the base 1, forms an inclined straight line. Apart from the difference, the separation membrane 2SM is identical with the separation membrane 1SM in FIG. 1, hence the same reference signs are used for the identical portions in FIG. 1 and FIG. 2 each other.

Figure 3:
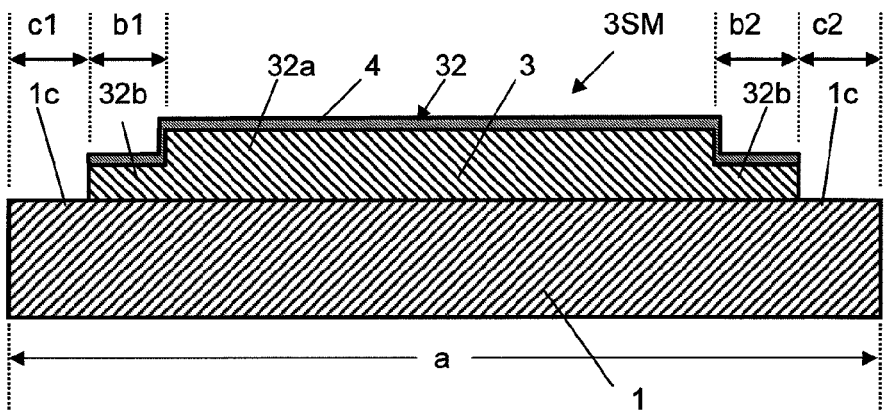
FIG. 3 is a cross-sectional view of another embodiment of the separation membrane.

FIG. 3 is a cross-sectional view of yet another embodiment of the separation membrane. In FIG. 3, a separation membrane 3SM comprises an elongated, fluid-permeable base 1 and a separation layer 32 which is formed over the surface of the base 1. The separation layer 32 comprises a first separation layer 3 and a second separation layer 4 which is formed over the surface of the separation layer 3.

The cross-sectional shape of the first separation layer 3 is identical to that of the separation layer 2 in FIG. 1. Therefore, the first separation layer 3 is identical with the separation layer 2 in FIG. 2 in terms of configuration. Similar to the separation layer 2 in FIG. 1, the first separation layer 3 has a predetermined thickness portion 32a and a thinner portion 32b.

The second separation layer 4, which is formed over the surface of the first separation layer 3, has a separation function which is different from that of the first separation layer 3. The second separation layer 4 can be formed using various methods; for example, a material for second separation layer formation is applied in a uniform thickness to the surface of the first separation layer 3 and solidified to form the second separation layer 4, or a material for second separation layer formation is interfacially polymerized on the surface of the first separation layer 3 to form the second separation layer 4.

The separation layer 32 of the separation membrane 3SM in FIG. 3 comprises a plurality of layers including a layer which is formed over the surface of the base 1 and comprises a material having a separation function, and a layer which is formed over the layer formed over the surface of the base 1 and comprises a material having a different separation function from that of the material of the layer formed over the surface of the base 1. This multilayer structure is often referred to as a composite membrane.

The difference between the separation membrane 3SM in FIG. 3 and the separation membrane 1SM in FIG. 1 is that the separation layer 2 in FIG. 1 comprises a single layer which is formed of a material having a separation function, whereas the separation layer 32 in FIG. 3 comprises a plurality of layers which are formed of multiple materials having different functions. Apart form the difference, the separation membrane 3SM is identical to the separation membrane 1SM in FIG. 1, hence the same reference signs are used for the identical portions in FIG. 1 and FIG. 3 each other.

Figure 4:
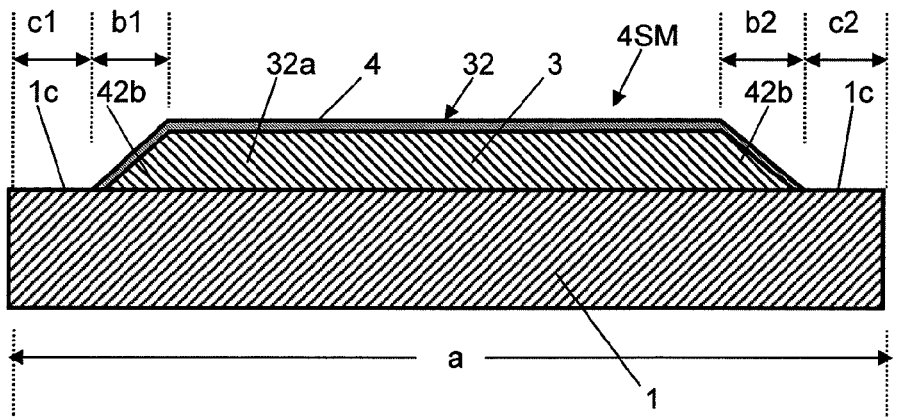
FIG. 4 is a cross-sectional view of another embodiment of the separation membrane.

FIG. 4 is a cross-sectional view of yet another embodiment of the separation membrane. The difference between the separation membrane 4SM in FIG. 4 and the separation membrane 3SM in FIG. 3 is the cross-sectional shape of the separation layer 32. The cross-sectional contour formed by the surface of the separation layer 32, which begins at either end of the predetermined thickness portion 32b and extends via the thinner portion 42b to the surface of the base 1, forms an inclined straight line. Apart from the difference, the separation membrane 4SM is identical with the separation membrane 3SM in FIG. 3, hence the same reference signs are used for the identical portions in FIG. 3 and FIG. 4 each other.

A fluid-permeable protective layer may be formed in a uniform thickness over the surface of the separation layer 2 in FIG. 1 or the separation layer 2 in FIG. 2. The fluid-permeable protective layer may be formed in a uniform thickness over the surface of the separation layer 32 in FIG.

3 or the separation layer 32 in FIG. 4. The protective layer is formed of a material having a function, for example, of reducing dirt on each separation layer, and this improves the antifouling properties of a separation membrane.

Figure 5:
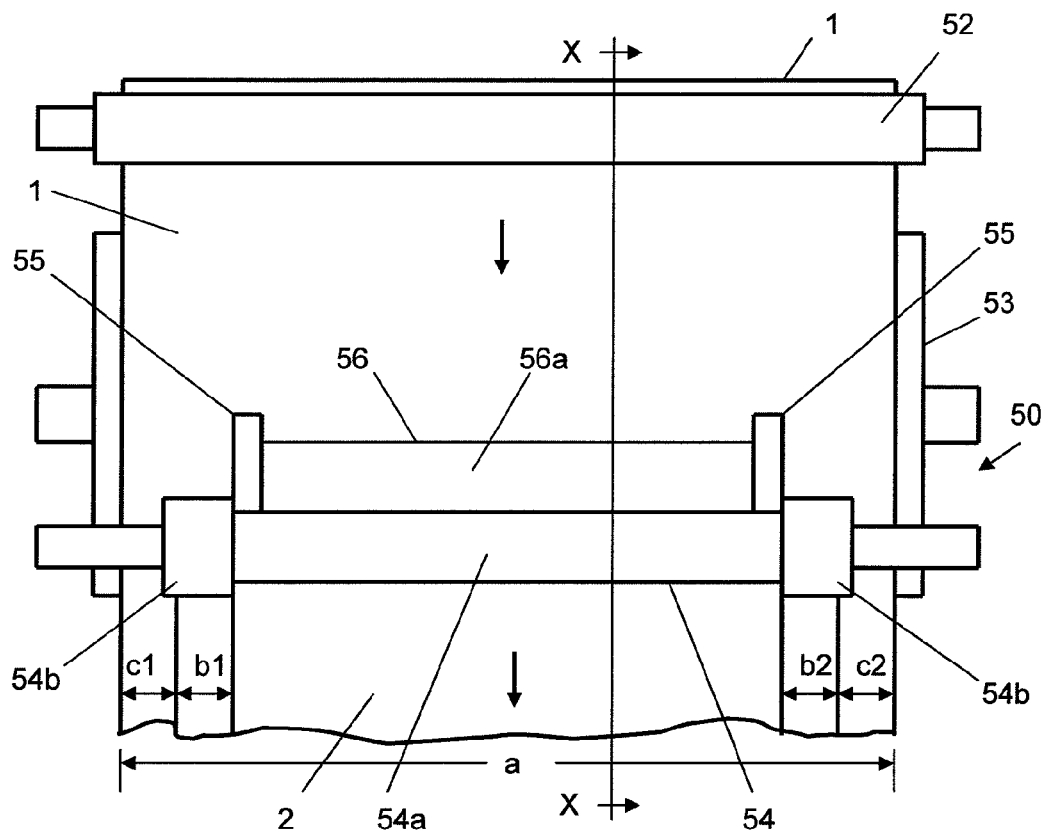
FIG. 5 is a planar schematic view of an example of a bar coater which is used in a polymer solution application step for applying a polymer solution over a surface of a base.
Figure 6:
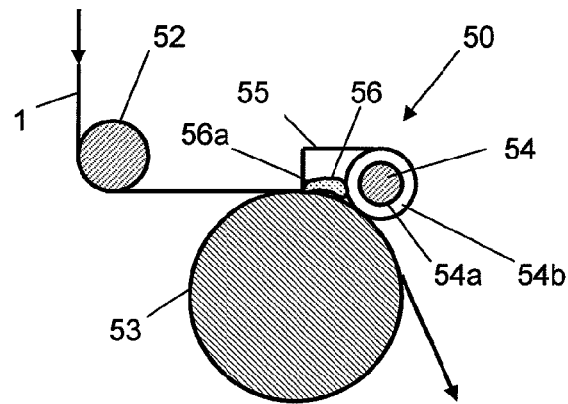
FIG. 6 is a vertical cross-sectional view as defined by arrows X-X in FIG. 5.
Figure 7:
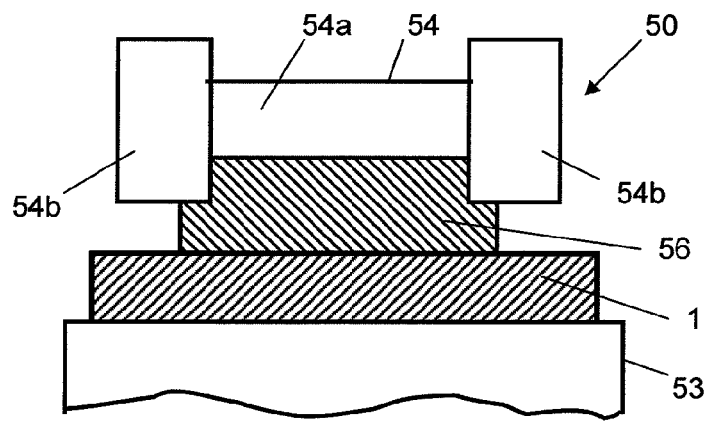
FIG. 7 is a cross-sectional view of a base to the surface of which a polymer solution is applied, using the coating bar shown in FIG. 5, which has a protruded portion on either end.

A method for producing the separation membrane 1SM in FIG. 1 is explained using FIGS. 5 to 7. FIG. 5 is a planar schematic view of and around a bar coater 50, which is used in a production process of the separation membrane 1SM. FIG. 6 illustrates the X-X vertical cross section defined by arrows in FIG. 5. FIG. 7 is a cross-sectional view of a base having a separation layer being formed over the surface thereof by a coating bar which is provided in the bar coater 50.

In these drawings, the bar coater 50 comprises a backup roll 53, a coating bar 54 which is disposed opposite to the surface of the backup roll 53, and side plates 55 which face the surface of the backup roll 53 and the surface of the coating bar 54 and are positioned on the left and the right away from each other. The coating bar 54 may be a rotary cylindrical bar having a circular cross-section, a non-rotary bar, a so-called roll-knife coating bar; a bar with an edge, or a blade-type bar. It may also have dents arranged periodically on its surface.

The elongated, fluid-permeable base 1 is transferred continuously and supplied by a rotary base supply roll 52 to the bar coater 50. In the bar coater 50, the surface of the base 1 contacts with the surface of the backup roll 53, and is transferred further. At the point when the base 1 is positioned on the surface of the backup roll 53, a solution for separation layer formation 56, which later becomes a separation layer, is fed in the space surrounded by the side plates 55, the coating bar 54 and the surface of the base 1, a solution bank 56a is formed.

In this state, as the base 1 moves, the solution for separation layer formation 56, which later becomes a separation layer, is applied by the coating bar 54 to the surface of the base 1 in a predetermined thickness.

The coating bar 54 comprises a predetermined diameter portion 54a which has a predetermined diameter, and a protruded portion 54b which has a diameter larger than that of the predetermined diameter portion 54a and is positioned on either end of the predetermined diameter portion 54a. The protruded portion 54b can be formed by machining a conventional coating bar in such a way that the coating bar has a thick walled portion formed thereon. For example, a desired protruded portion can be formed on either end surface of a conventional cylindrical bar by bonding a thin membrane having a thickness which enables the formation of a thinner portion in the position where the thinner portion (the thinner portion 12b in FIG. 1, and the thinner portion 22b in FIG. 2) is to be formed.

The solution for separation layer formation 56 which has been applied to the surface of the base 1 by the coating bar 54 is subsequently solidified to form a separation layer 2 in the shape shown in FIG. 1. That is to say, the predetermined diameter portion 54a forms the predetermined thickness portion 12a, and the protruded portion 54b forms the thinner portion 12b. This state is illustrated in FIG. 5, which illustrates widths b1, b2, c1, and c2, but actually, the solution for separation layer formation 56 is yet to become solid in the state in FIG. 5, and therefore, the state in FIG. 5 does not completely correspond to the state in FIG. 1. Note that the widths b1, b2, c1, and c2 are given in FIG. 5 for easier interpretation of the drawing.

Next, the following explains a base and a solution for forming a separation layer.

A separation membrane comprises a separation layer which comprises a material having a separation function and is formed over a surface of an elongated, fluid-permeable base. The base has a function as a support body of the separation layer and a function of increasing the strength of the separation membrane. It is preferable that the separation layer is formed over the surface of the base while infiltrating to a certain depth of the base, or through to the reverse side of the base, to ensure secure integration of the separation layer and the base.

The base comprises, for example, a woven fabric, a non-woven fabric or a net, which is formed of polyester, polypropylene, polyethylene or polyamide fibers. The non-woven fabric is a preferred material for the base because of its properties for forming a separation layer (film forming properties) over the surface of the base, and in terms of cost.

The non-woven fabric can be produced, for example, by making a sheet with uniformly water-dispersed short fibers as the main ingredient and binder fibers, using a cylindrical net or a long-sheeted net, and subsequently drying the sheet. The sheet is then sandwiched between two heated rolls, heated, and compressed, whereby the fluff on a produced non-woven fabric is reduced and the mechanical properties thereof can be improved.

A separation layer is a membrane having a function of separating a target ingredient from a stock solution. The separation layer may comprise a single layer which is made of a material having a separation function, or may comprise a plurality of layers which are made of multiple materials having different separation functions. The separation layer is often referred to as asymmetric membrane, when comprising a single layer, and as a composite membrane when comprising a plurality of layers.

The asymmetric membrane is produced by casting a membrane-forming solution for asymmetric membrane formation over a surface of a base to form a membrane of the membrane-forming solution over the surface of the base and subsequently solidifying the membrane of the membrane-forming solution which has been formed over the surface of the base. The asymmetric membrane formed is a microporous body.

Examples of the polymer material used to prepare the membrane-forming solution include polyacrylonitrile, polysulfone, polyethersulfone, polyphenylene sulfone, polyphenylene sulfide sulfone, polyvinylidene fluoride, cellulose acetate, polyethylene, and polypropylene. The thickness of the microporous body varies depending on its intended use, but may preferably be in the range approximately 20 to 200 μm.

A composite membrane comprises a separation layer (a first separation layer) of a microporous material, and a second separation layer which is formed over the first separation layer for performing a primary separation function. The composite membrane is formed by first forming a separation layer (a first separation layer) of a microporous material, over the surface of a base, and then forming a second separation layer which provides a primary separation function, over the first separation layer of a microporous material. This separation layer of a microporous material can be produced by the same method as for a separation layer of a microporous material, as in the asymmetric membrane.

Examples of the polymer material for forming the separation layer of a microporous material include polysulfon, polyethersulfone, polyphenylene sulfide sulfone, polyphenylene sulfone, polyphenylene oxide, polyphenylene sulphide, polyacrylonitrile, polyamide, polyester, polyimide, and cellulose acetate.

Examples of the polymer material for forming the second layer for providing a primary separation function include polyamide and polyimide. A membrane formed of these layers is normally referred to as semi-permeable membrane.

The thickness of the separation layer (the first separation layer) of a microporous material varies depending on its intended use, but a thickness of approximately 20 to 200 μm is usually appropriate. The advantage of using a composite membrane is the possibility to adjust the separation membrane performance in various ways by combining various membranes.

The separation membrane may be used as an ultrafiltration membrane, a microfilter membrane, a reverse osmosis membrane or a nanofiltration membrane. The ultrafiltration membrane and the microfilter membrane preferably comprise a separation layer which is formed from, for example, an alkali-resistant polysulfone-based polymer, such as polysulfone, or a hinglychemical-resistant fluorine-based polymer, such as polyvinylidene.

The nanofiltration membrane and the reverse osmosis membrane preferably comprise a second separation layer which is formed from, for example, highly hydrolysis-resistant, chemical-resistant and pressure-resistant cellulose acetate, or polyamide. In particular, to produce a separation membrane having a high salt rejection rate and a high water production capacity, it is preferable that the semi-permeable membrane in the above composite membrane is formed of an aromatic polyamide.

A surface of the separation layer of an asymmetric membrane, or a surface of the second separation layer of a composite membrane may be further coated with a material for protective layer formation to form a protective layer thereon, with the purpose of providing antifouling properties. An example of a coating membrane for providing antifouling properties is a hydrophilic polymer coating membrane, such as a polyvinyl alcohol membrane.

Materials for forming the base, the separation layer, the second separation layer and the protective layer which are described in the above are known in the art. The separation membrane and the method for production thereof which are proposed in the present specification are characterized by meeting the following technical features.

Specifically, a separation layer formed over a surface of a base comprises a predetermined thickness portion having a predetermined thickness and a thinner portion positioned on the outside of each widthwise end of the predetermined thickness portion and having a thickness smaller than the predetermined thickness, and the base includes a separation-layer-lacking portion (a base-exposed portion), at which only the base is present and the separation layer is absent, between either widthwise outer end of the thinner portion and either widthwise end of the base. Meeting these technical features enables the provision of a separation membrane which is practically free from curling.

Figure 13:
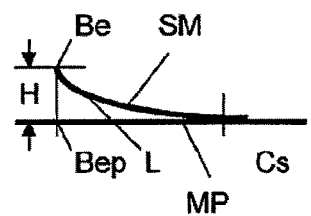
FIG. 13 is a cross-sectional view of one end portion of a base for explaining how to determine whether or not curling actually exists in a base.

FIG. 13 explains how to determine whether or not curling actually exists on a base. FIG. 13 illustrates a cross section of one end portion of a base in order to explain how to determine whether or not curling actually exists on a base. In FIG. 13, a separation membrane SM is placed on the flat upper surface of a measurement plate MP in such a way that the upper surface of the measurement plate MP and the reverse surface of the base of the separation membrane SM face each other. After such placement, if any curl is present in the side end portion of the separation membrane SM, the end portion Be of the base will be in a raised state above the upper surface of the measurement plate MP. In this state, the distance between the point Bep at which the perpendicular line drawn from the end portion Be of the base meets with the upper surface of the measurement plate MP and the end portion Be of the base is defined as curl height H. The point at which the base begins to separate from the upper surface of the measurement plate MP is defined as curl starting point Cs, and the length from the curl starting point Cs along the base to the end portion Be of the base is defined as curl length L.

Whether or not curling actually exists on the base is determined with reference to the curl length L and the curl height H. To be more specific, if the curl length L is below 60 mm and the curl height H is below 55 mm, it is determined that the separation membrane SM has no curl. In other words, it is determined that such a curl is virtually nonexistent. In contrast, if the curl length L is 60 mm or more and the curl height H is 55 mm or more, it is determined that the separation membrane has curls.

The predetermined thickness of a separation layer refers to a thickness of the separation layer which is required for performing the intended separation function.

The separation layer which is formed by solidifying an applied layer of a polymer solution suffers from a smaller thermal shrinkage during solidification and cleaning, leading to a smaller force for pulling the base, as its thickness decreases. This phenomenon is used for suppressing the occurrence of curling at both end portions of the base. To be more specific, a thinner portion having a thickness smaller than the predetermined thickness of the separation layer is provided at both widthwise end portions of the separation layer to reduce the force for pulling the base which is generated at both end portions of the thinner portion. In order to increase this effect further, it is preferable that the thickness of the thinner portion becomes smaller outwards in a sloped manner and/or in a step-like manner.

In order for the thinner portion to exert such an effect, it is preferable that the widths b1 and b2 (see FIGS. 1 to 4) of the thinner portions are wide rather than narrow. However, too wide a width will decrease the effective membrane area for performing a separation function. The widths b1 and b2 of the thinner portions are preferably 0.1 to 10%, and more preferably 0.1 to 5%, of the width a of the base.

The thickness of each thinner portion is preferably 5 to 95%, more preferably 30 to 80%, and even more preferably 45 to 65%, of the thickness of the predetermined thickness portion. A thickness of approximately 20 to 40 μm is usually appropriate for the thinner portion.

The thickness of a thinner portion as referred to herein is the average of thickness measurements made across its width. To be more specific, the thickness of a thinner portion is the average of 20 measured values of the thickness which are made using a microscope at 20 equally spaced points, including both ends, across the width of the thinner portion.

The thickness of the predetermined thickness potion as referred to herein is the average of thickness measurements made across the width of the portion of the separation layer other than the thinner portions. To be more specific, the thickness of the predetermined thickness portion is the average of 20 measured values of the thickness which are made using a thickness gauge at 20 equally spaced points, including both ends, across the width of the predetermined thickness portion.

Providing a base-exposed portion on the outside of each thinner portion refers to providing at the very side edge on each side of the base a portion to which the polymer solution is not at all applied. Curling does not occur in this base-exposed portion while the polymer solution is solidified and while the separation membrane is washed, and therefore the base-exposed portion effectively prevents the separation membrane from curling. It should be noted, however, although the base-exposed portion is provided, if the thinner portion is not present, the base-exposed portion will be rolled into the curl generated at each end portion of the separation layer, making it difficult to prevent curling.

The widths c1 and c2 (see FIGS. 1 to 4) are preferably 0.1 to 10%, more preferably 0.1 to 5%, of the width a of the base. It is preferable that the width of each base-exposed portion is large rather than narrow in view of preventing curls. However, a width exceeding 10% of the width a of the base will decrease the effective membrane area for performing a separation function.

The height of the protruded portion 54b of the coating bar measured from the surface which serves to form the predetermined thickness portion, is preferably 5 to 95%, more preferably 30 to 80%, of the distance between the position of the surface of the base and the position of the surface of the coating bar which serves to form the predetermined thickness portion (surface of the portion other than the protruded portion). The height of the protruded portion functions for forming the thickness of the thinner portion.

The thinner portions may be formed by other means such as reducing the application quantity of the polymer solution only in the parts where the thinner portions are to be formed.

Example 1

For a base, a nonwoven polyester fabric (basic weight 60 g/m2, thickness 80 μm, width 1,000 mm) was used. For a material for separation layer formation, polysulfone (Solvay Advanced Polymers, L.L.C., Udel (registered trademark) P-3500) was used. This polysulfone was dissolved in dimethylformamide and the resulting polysulfone solution (concentration 16 wt %, temperature 20° C.) was used as a polymer solution for separation layer formation. This polymer solution was applied to the front surface of the nonwoven fabric, except both ends thereof of a certain width. At this time, a bar coater (see FIG. 7) equipped with a coating bar having a step-like surface provided with a 50 μm high protruded portion (a thick diameter portion) at each end was placed on the front surface of the nonwoven fabric, to which the polymer solution was applied, and the polymer solution was applied to the front surface of the nonwoven fabric in such a way that a predetermined thickness was achieved, as well as that a predetermined thinner portion was formed by the protruded portion (the thick diameter portion) of the coating bar at the left and the right widthwise end portion. The reverse surface of the nonwoven fabric was supported by a backup roll across the entire width.

The nonwoven fabric was soaked in pure water at a temperature of 20° C. after 0.5 seconds of the application of the polymer solution thereto, and the polysulfone was solidified to produce a separation membrane comprising a microporous separation functioning layer (the thickness of the predetermined thickness portion: 50 μm, the thickness of the thinner portion: 30 μm) formed on the front surface of the nonwoven fabric. The separation membrane obtained was washed in a water bath to remove the residual solvent in the separation membrane, and then the separation membrane was taken up using a winding device.

In the separation membrane thus produced, the left and right end portions of the separation layer had a shape as shown in FIG. 1. The widths c1 and c2 of the base-exposed portion, the widths b1 and b2 of the thinner portions and the thickness of the thinner portions were as shown in Table 1.

When the left and right end portions of the separation membrane were examined with the naked eye for the presence of any curls, no curl was detected. Here, "curl" means a curl which is so significant that the membrane production process is interrupted (the same applies in Examples and Comparative Examples given below). Incidentally, "left side" and "right side" in Table 1 mean the right side end portion and the left side end potion relative to the moving direction of the base.

Comparative Example 1

Figure 8:
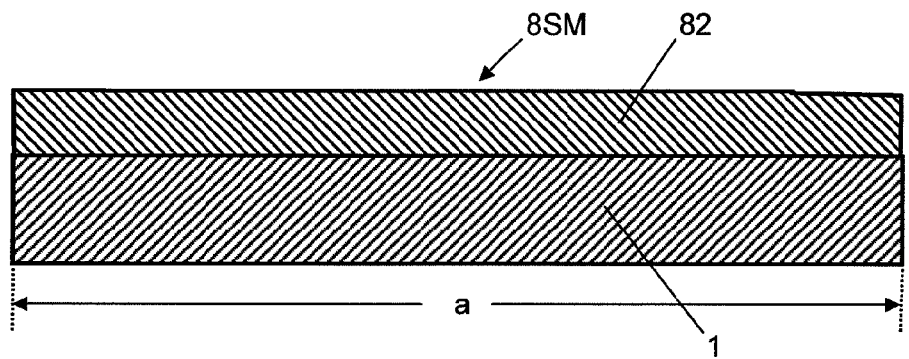
FIG. 8 is a cross-sectional view of a separation membrane produced in Comparative Example 1.

A separation membrane was produced in the same way as in Example 1, except that in this comparative example, a cylindrical coating bar having no protruded portion on the surface in contact with the polymer solution was used, and that the polymer solution was applied to the base including the left and right end portions thereof. FIG. 8 is a cross-sectional view of the separation membrane produced. In FIG. 8, the separation layer 82 of the separation membrane 8SM produced was formed from the left end all the way to the right end of the base 1 and the base 1 had no base-exposed portion. The thickness of the separation layer 82 was constant all the way to either left or right end portion of the base 1, and there was no thinner portion. The left and right end portions of the separation membrane 8SM were examined for the presence of any curls, and the occurrence of curling was so evident that the membrane production had to be interrupted for a while.

Comparative Example 2

Figure 9:
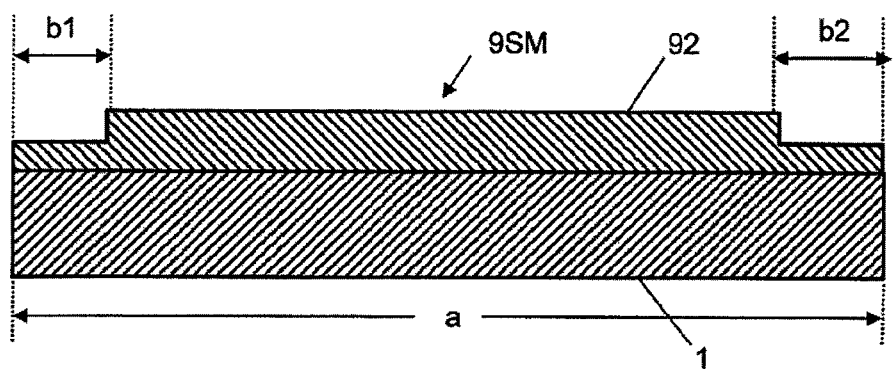
FIG. 9 is a cross-sectional view of a separation membrane produced in Comparative Example 2.

A separation membrane was produced in the same way as in Example 1, except that in this comparative example, the polymer solution was applied to the base including both end portions thereof. FIG. 9 is a cross-sectional view of the separation membrane produced. In FIG. 9, the separation layer 92 of the separation membrane 9SM produced was formed from the left end all the way to the right end of the base 1 and the base 1 had no base-exposed portion. The widths b1 and b2 and the thickness of the thinner portion were as shown in Table 1. The left and right end portions of the separation membrane 9SM were examined for the presence of any curls, and the occurrence of curling was so evident that the membrane production had to be interrupted for a while.

Comparative Example 3

Figure 11:
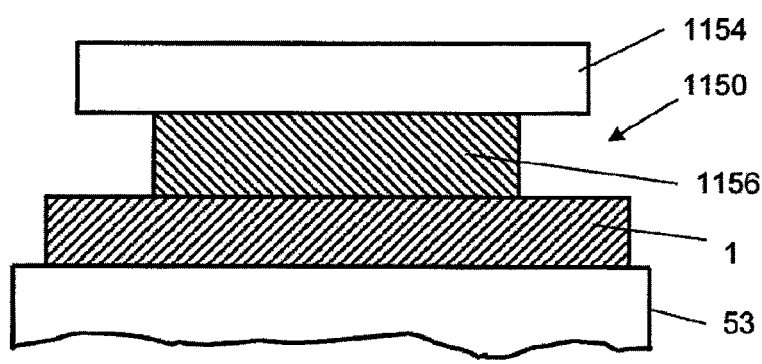
FIG. 11 is a cross-sectional view of a base to the surface of which a polymer solution is being applied, using a coating bar without a protruded portion on either end thereof.
Figure 12A:
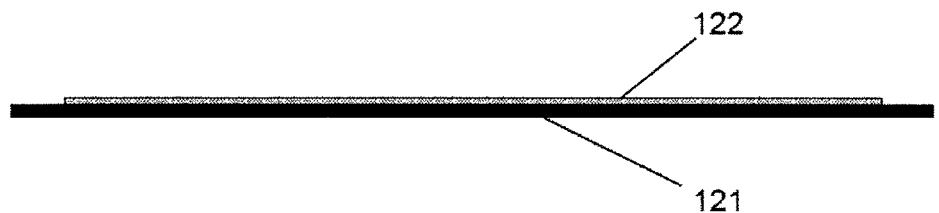
FIG. 12a is a cross-sectional view of a base immediately after a polymer solution has been applied to the base.
Figure 12B:
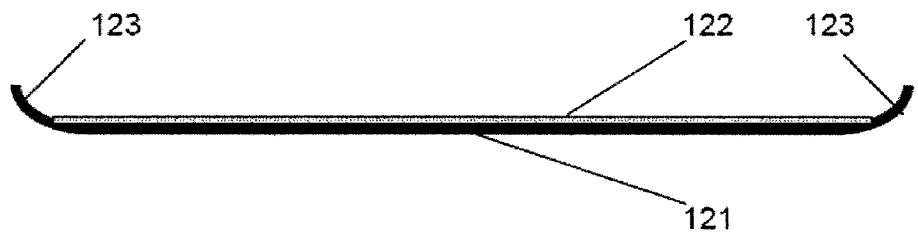
FIG. 12b is a cross-sectional view of the base shown in FIG. 12a with curls beginning to develop.
Figure 12C:
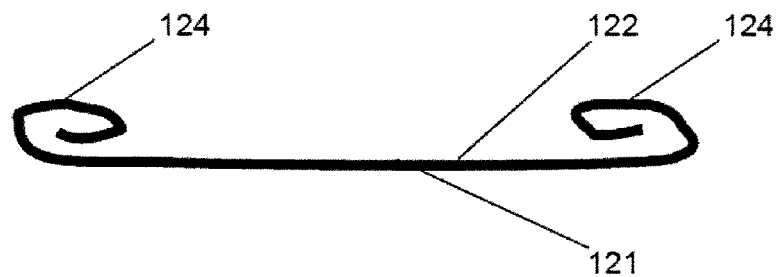
FIG. 12c is a cross-sectional view of the base shown in FIG. 12b with further development of the curls.

A separation membrane was produced in the same way as in Example 1, except that in this comparative example, the coating bar used had no stepped portion on the surface in contact with the polymer solution. FIG. 11 is a cross-sectional view of the base whose surface was coated with the polymer solution using a coating bar having no stepped portion. In FIG. 11, the polymer solution 1156 was applied to the surface of the base 1 using a step-free coating bar 1154 fixed on a bar coater 1150. The reverse surface of the base 1 was supported by the backup roll.

Figure 10:
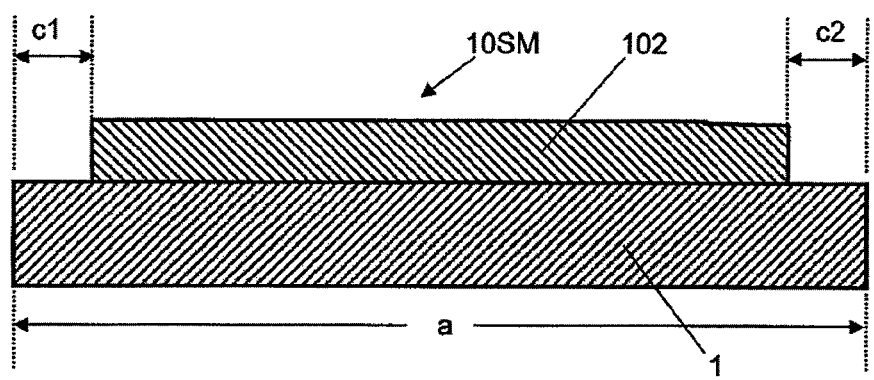
FIG. 10 is a cross-sectional view of a separation membrane produced in Comparative Example 3.

FIG. 10 is a cross-sectional view of the separation membrane produced. In FIG. 10, the separation membrane 10SM produced had a base-exposed portion between the left or the right end of the separation layer 102 and the left or the right end of the base 1. The widths c1 and c2 of the base-exposed portion at the left and the right end portion of the separation membrane 10SM were as shown in Table 1. The thickness of the separation layer 102 was constant all the way to either the left or the right end portion of the separation membrane 10SM, and there was no thinner portion. The left and right end portions of the separation membrane 10SM were examined for the presence of any curls, and the occurrence of curling was so evident the membrane production had to be interrupted for a while.

Example 2

The separation membrane produced in Example 1 was soaked in an aqueous solution containing 2 wt % m-phenylenediamine for 1 minute. After the removal of the excess amine aqueous solution from the surface of a polysulfone membrane forming a separation layer (a first separation layer), the polysulfone membrane was dried with a hot air dryer at a temperature of 80° C. for 1 minute to evaporate the aqueous solution. Following this, the surface of the polysulfone membrane was coated with an n-decane solution containing 0.1 wt % trimesic acid chloride in such a way that the membrane surface was completely wet, and subsequently the membrane surface was left still for 1 minute to form a polyamide separation layer (a second separation layer) having a reverse osmosis separation function over the polysulfone membrane, thus completing a separation membrane.

In the separation membrane produced, the left and right end portions of the separation layers had shapes as shown in FIG. 3. The widths c1 and c2 of the base-exposed portions, and the widths b1 and b2 and the thickness of the thinner portions were as shown in Table 1.

When the left and right end portions of the separation membrane were examined with the naked eye for the presence of curls, no curl was detected.

Example 3

The coating bar used in Example 1, which had a protruded portion having a step-like surface, was replaced with one with a protruded portion having a sloped surface to produce a separation membrane having the shape shown in FIG. 2. The results obtained in this case were as shown in Table 1. No curl was detected.

TABLE 1

| Measurement Item | | Example 1 | Comparative Example 1 | Comparative Example 2 |
|---|---|---|---|---|
| Presence of curls | Left side | No | Yes | Yes |
| | Right side | No | Yes | Yes |
| Width of base-exposed portion [mm] | Left side (c2) | 25 | 0 | 0 |
| | Right side (c1) | 28 | 0 | 0 |
| Width of thinner portion [mm] | Left side (b2) | 10 | 0 | 10 |
| | Right side (b1) | 10 | 0 | 10 |
| Thickness of thinner portion [µm] | | 30 | — | 30 |

| Measurement Item | | Comparative Example 3 | Example 2 | Example 3 |
|---|---|---|---|---|
| Presence of curls | Left side | Yes | No | No |
| | Right side | Yes | No | No |
| Width of base-exposed portion [mm] | Left side (c2) | 25 | 28 | 26 |
| | Right side (c1) | 26 | 30 | 27 |
| Width of thinner portion [mm] | Left side (b2) | 0 | 9 | 11 |
| | Right side (b1) | 0 | 10 | 10 |
| Thickness of thinner portion [µm] | | — | 29 | 25 |

INDUSTRIAL APPLICABILITY

The separation membrane and the method for production thereof according to the invention are used as reverse osmosis membranes, microfilter membranes, ultrafiltration membrane and the like, and for the production thereof. This separation membrane serves, for example, in the water treatment field including seawater desalination, water purification and drainage treatment.

REFERENCE SIGNS LIST

1: base
1c: separation-layer-lacking portion (base-exposed portion)
SM, 1SM, 2SM, 3SM, 4SM, 8SM, 9SM, 10SM: separation membrane
2, 32, 82, 92, 102: separation layer
3: first separation layer
4: second separation layer
12a, 32a: predetermined thickness portion
12b, 22b, 32b, 42b: thinner portion
50, 1150: bar coater
52: base supply roll
53: backup roll
54, 1154: coating bar
54a: predetermined diameter portion
54b: protrude portion
55: side plate
56, 1156: solution for separation layer formation (polymer solution)
56a: solution bank
121: base
122: coating film
123: curl
124: curled up curl
a: width of the base
b1, b2: width of the thinner portion
c1, c2: width of the separation-layer-lacking portion (base-exposed portion)
MP: measurement plate
Cs: point at which the curl begins to develop
Be: end portion of the base
Bep: point at which the perpendicular line drawn from the end portion of the base meets with the upper surface of the measurement plate when curling occurs
L: curl length
H: curl height

The invention claimed is:

1. A separation membrane being substantially free from curling comprising an elongated fluid-permeable base and a first separation layer formed over substantially most of the base,
wherein the base comprises any one of a woven fabric, a non-woven fabric or a net,
wherein the first separation layer composed of a polymer material is a single layer being formed over the base while infiltrating to a certain depth of the base or through to the reverse side of the base,
wherein the first separation layer includes:
a predetermined thickness portion having a predetermined substantially uniform thickness; and
a thinner portion positioned outside of each widthwise end of the predetermined thickness portion and having a thickness smaller than the predetermined substantially uniform thickness, and wherein a separation-layer-lacking portion, at which only the base is present while the first separation layer is absent, exists between each widthwise outer end of the thinner portion and each widthwise end of the base, said widthwise ends perpendicular to the longitudinal direction of the base, wherein a width of the thinner portion positioned on an outside of each widthwise end of the predetermined thickness portion is 0.1 to 10% of a width of the elongated fluid-permeable base, and wherein a width of the separation-layer-lacking portion which exists between the widthwise outer end of the thinner portion and the widthwise end of the elongated fluid permeable base is 0.1 to 10% of the width of the elongated fluid-permeable base.

2. The separation membrane according to claim 1, wherein the base is formed of a nonwoven fabric, and the first separation layer is formed of one or more than one of the group consisting of polysulfone, polyvinylidene fluoride and cellulose acetate.

3. The separation membrane according to claim 1, wherein a second separation layer having a substantially uniform thickness is present on a surface of the first separation layer.

4. The separation membrane according to claim 3, wherein the base is formed of a nonwoven fabric, the first separation layer is formed of polysulfone, and the second separation layer is formed of polyamide.

5. The separation membrane according to claim 1, wherein a fluid-permeable protective layer having a substantially uniform thickness is present over a surface of the first separation layer.

6. The separation membrane according to claim 1, wherein a second separation layer having a substantially uniform thickness is present on a surface of the first separation layer, and a fluid-permeable protective layer having a substantially uniform thickness is present over a surface of the second separation layer.

7. The separation membrane according to claim 1, wherein the thickness of each thinner portion is substantially uniform in the width direction thereof, or becomes smaller or changes in a step-like manner as the thinner portion is sloped towards the widthwise outer end.

8. The separation membrane according to claim 1, wherein the thickness of the thinner portion is 5 to 95% of the thickness of the predetermined thickness portion.

9. The separation membrane according to claim 1, wherein the width of the thinner portion positioned on the outside of each widthwise end of the predetermined thickness portion is 0.1 to 5% of the width of the elongated fluid-permeable base.

10. The separation membrane according to claim 1, wherein the width of the separation-layer-lacking portion which exists between the widthwise outer end of the thinner portion and the widthwise end of the elongated fluid-permeable base is 0.1 to 5% of the width of the elongated fluid-permeable base.

* * * * *